United States Patent [19]

Demaschquie

[11] 4,421,538
[45] Dec. 20, 1983

[54] DEVICE FOR THE MANUFACTURE OF GLASS FILAMENTS

[75] Inventor: Osama Demaschquie, Hochheim, Fed. Rep. of Germany

[73] Assignee: Eglasstrek Patent Promotion & Awarding GmbH, Hochheim, Fed. Rep. of Germany

[21] Appl. No.: 259,823

[22] Filed: May 4, 1981

[30] Foreign Application Priority Data

May 7, 1980 [DE] Fed. Rep. of Germany ....... 3017374

[51] Int. Cl.³ .......................................... C03B 37/025
[52] U.S. Cl. ........................................ 65/1; 65/10.1; 65/11.1; 65/347; 65/DIG. 4; 65/12
[58] Field of Search ................... 65/2, 10.1, 11.1, 347, 65/DIG. 4, 136, 1, 12

[56] References Cited

U.S. PATENT DOCUMENTS

| | | | |
|---|---|---|---|
| 3,244,495 | 4/1966 | Apple et al. | 65/347 X |
| 3,264,076 | 8/1966 | Veazie et al. | 65/10.1 X |
| 3,539,318 | 11/1970 | Glaser et al. | 65/10.1 X |
| 3,589,879 | 6/1971 | Yantsev et al. | 65/11.1 |
| 3,818,112 | 6/1974 | Cishem et al. | 65/DIG. 4 |
| 3,912,477 | 10/1975 | Brady et al. | 65/1 |
| 4,270,941 | 6/1981 | Babbitt | 65/10.1 X |
| 4,294,603 | 10/1981 | Winzer et al. | 65/136 X |
| 4,325,721 | 4/1982 | Jensen | 65/1 |

FOREIGN PATENT DOCUMENTS

| | | |
|---|---|---|
| 1496406 | 10/1969 | Fed. Rep. of Germany ... 65/DIG. 4 |
| 1596552 | 10/1969 | Fed. Rep. of Germany . |
| 1696038 | 8/1973 | Fed. Rep. of Germany . |
| 2346963 | 12/1976 | Fed. Rep. of Germany . |
| 1051516 | 9/1953 | France . |
| 1265650 | 7/1961 | France . |

OTHER PUBLICATIONS

"The Manufacturing Technology of Continuous Glass Fibers", Loewenstein, Elsevier Scientific Publishing Co., NY, 1973, pp. 68–70.

Primary Examiner—Robert L. Lindsay, Jr.
Attorney, Agent, or Firm—Karl F. Ross; Herbert Dubno

[57] ABSTRACT

A forehearth supplied with molten glass from a tank furnace, with bottom passages overlying bushings for the extrusion of vitreous filaments, forms an elongate chamber whose sidewalls are penetrated by heating electrodes spaced apart in the longitudinal direction and arrayed in two relatively staggered tiers. The electrodes of the lower tier are more numerous in the vicinity of the bottom passages than between these passages. The heating effect of the electrodes can be supplemented by top burners disposed above the glass level.

11 Claims, 3 Drawing Figures

DEVICE FOR THE MANUFACTURE OF GLASS FILAMENTS

FIELD OF THE INVENTION

My present invention relates to a device for the manufacture of vitreous filaments, especially of glass fibers for the reinforcement of plastics (according to DIN norms 1259 and 61853), with a heated forehearth (also known as feeder) exposed to the atmosphere, which contains a bath of molten and flowable glass of high specific electrical resistivity and has at least one passage leading to an individually heated bushing. The composition of the molten glass, to which my present invention is especially applicable, is described in U.S. Pat. No. 2,571,074.

Devices for the production of glass filaments are known in which top burners using conventional fuels are situated above a mass of molten glass, previously produced in an associated tank furnace, to maintain its temperature at the proper level required by the bushing. This production process is generally known as the "direct method" and the fiber-drawing temperature of the molten glass in the forehearth is about 1200° C. In French Pat. No. 1,051,516 and in German patent application Nos. 16 96 038 and 23 46 963 such devices have been described.

The aforementioned devices have the disadvantage that heat loss occurs at the sidewalls and the bottom in the interior of the forehearth as well as in the outlet of the forehearth which therefore creates an unfavorable vertical temperature gradient in the glass mass so that the temperatures at the surface of the glass mass in the forehearth have to be about 150° to 250° C. above those required at the bushing and in the outlet leading to same.

To avod this disadvantage, German patent application No. 15 96 552 describes a bushing pot which is connected through a narrow passage with the forehearth and is well insulated. This narrow passage is supposed to prevent heat loss in the forehearth. Apart from the difficulty encountered with regulating the glass flow from the forehearth to the bushing pot, which in practice cannot be controlled, this construction proves cumbersome and expensive.

The unfavorable temperature gradient in the known type of forehearth is furthermore intensified as the molten glass is produced in tank furnaces that are internally lined with chromic-oxide refractories which give the molten glass mass a green tint. On account of this green tint the infrared absorption is substantially greater than with differently colored or colorless molten glass, the consequence being that with the known devices the temperature of the green-tinted glass at the bottom of the forehearth is substantially lower than it would otherwise be. This condition increases the temperature drop in the forehearth and enhances the possibility of crystal formation in the corner regions of the forehearth and its outlet, as described in U.S. Pat. No. 3,265,478.

With conventional glass-fiber-production devices, as described in German printed specification No. 17 96 172 and French Pat. No. 1,265,650, the forehearth is operated with a molten-glass column of 200 to 250 mm height above the bushing. To achieve a desired temperature of 1200° C. at the bushing, the surface of the molten glass would have to be heated by means of the aforementioned top burners to at least 1350° C. Should the molten-glass column be raised above 250 mm, with a consequent increase in static pressure, a satisfactory extrusion of the molten glass through the bushings would not be ensured as the glass temperature would drop sharply. On the other hand, the low static pressure of the molten-glass column in the forehearths of conventional devices impairs the processing efficiency. A further drawback of the conventional devices is the high temperature of 1350° C. above the molten-glass bath in the forehearth, which causes the evaporation of volatile components of the glass mass such as boric acid, sodium carbonate and fluorine. Such evaporation from the surface of the molten glass frequently causes a change in its homogeneity which in turn is the cause for difficulties encountered in endless-filament production.

Inside the forehearth, a dense zirconium-silicate material is generally employed as a refractory lining. This material is advantageous for glass-fiber production in that it corrodes without disagreeable or harmful side effects; however, the corrosion of zirconium silicate progresses increasingly with higher temperatures in the space above the molten glass. The service-life expectancy of such a conventional forehearth is therefore reduced.

OBJECT OF THE INVENTION

The object of my invention is to eliminate the aforementioned disadvantages of known devices in the production of glass filaments.

SUMMARY OF THE INVENTION

I realize this object, in accordance with my present invention, by the provision of heating means including a multiplicity of electrodes extending into an elongate chamber formed by the forehearth, these electrodes being distributed throughout the length of the chamber below the level of a mass of molten glass contained therein but above the floor thereof which has a plurality of longitudinally spaced-apart passages overlying respective bushings.

Advantageously, pursuant to a more particular feature of my invention, the concentration of the electrodes is higher in the vicinity of the floor passages than at intervening locations. With electrodes divided into two sets extending horizontally into the chamber from opposite sides, each passage may be flanked by two pairs of aligned electrodes from the two sets.

In a device embodying my invention it becomes possible to avoid, or at least to minimize, the negative vertical temperature gradient with its detrimental effect on the glass-fiber production.

On account of the direct electrical heating of the molten glass mass of high specific electrical resistivity in the immediate proximity of the corner regions of the entrance or entrances to the bushing or bushings, no crystal formation can take place whereby another disadvantage of prior-art devices is eliminated.

The electrodes are preferably manufactured of molybdenum with an outer diameter between 5 and 30 mm. The molybdenum electrode is fitted, preferably screwed, onto a heat-resistant holder, preferably of stainless steel. To prevent oxidation of the molybdenum, such an electrode can be covered with a protective cap in endangered areas. The holder of the electrode can be cooled either by water or with the aid of ribs, depending on the deployment area. Such protected electrode holders are well known in the art.

The electrodes are emplaced with a preferred mutual separation of 100 to 250 mm; that distance need not be uniform but may be reduced in the areas of the bushing entrances.

A further advantage of the device in accordance with the invention lies in the fact that the body of molten glass is homogeneously heated throughout its entire cross-section, which is equivalent to an enlargement of the usable cross-section of the forehearth.

The suppression of the temperature gradient between the forehearth and the bushing enables the column of molten glass to be adjusted to a height of 100 to 1,000 mm whereby the efficiency of the device is substantially increased.

One of the main advantages of the invention is that the temperature above the molten-glass surface can be reduced to the level required at the bushing; thus, evaporation from that surface is significantly diminished.

Furthermore, the corrosion of the internal refractories lining the forehearth and its outlet is considerably reduced, at least by 40 to 50%, whereby the life expectancy of the assembly is improved. The lowering of the temperature above the glass surface in the forehearth from 1350° C. to approximately 1200° C. decreases energy consumption and establishes thermic and chemical homogeneity.

A device embodying my invention can be readily integrated into already existing installations equipped only with the usual top-burner system.

My improved device furthermore allows for an at least two- or threefold increase in the length of the forehearth and an at least twofold increase in its width.

BRIEF DESCRIPTION OF THE DRAWING

The above and other features of my invention will now be described in detail with reference to the accompanying drawing in which.

SPECIFIC DESCRIPTION

Figure 1:
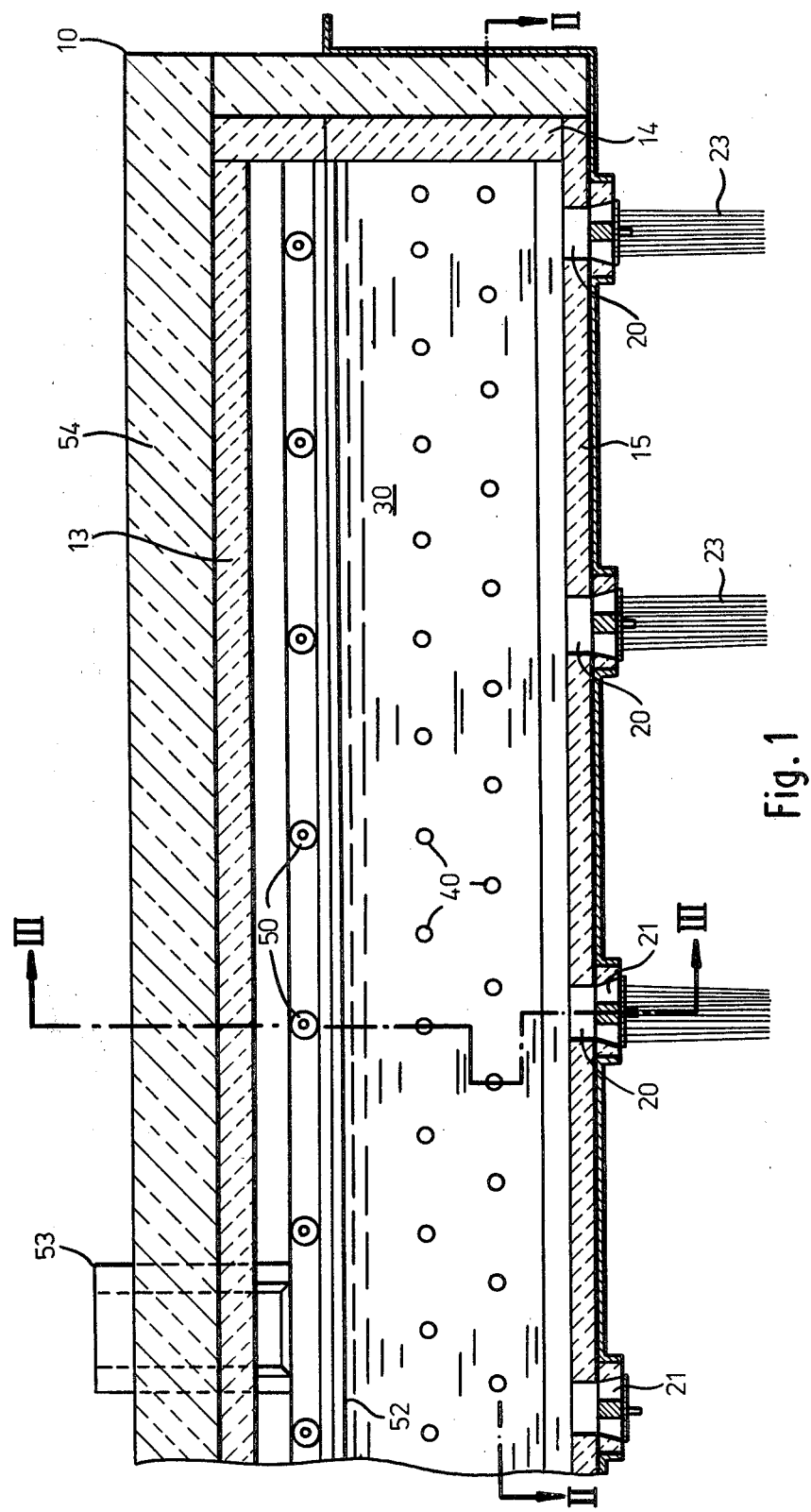
FIG. 1 is a longitudinal sectional view of a device in accordance with the invention.
Figure 2:
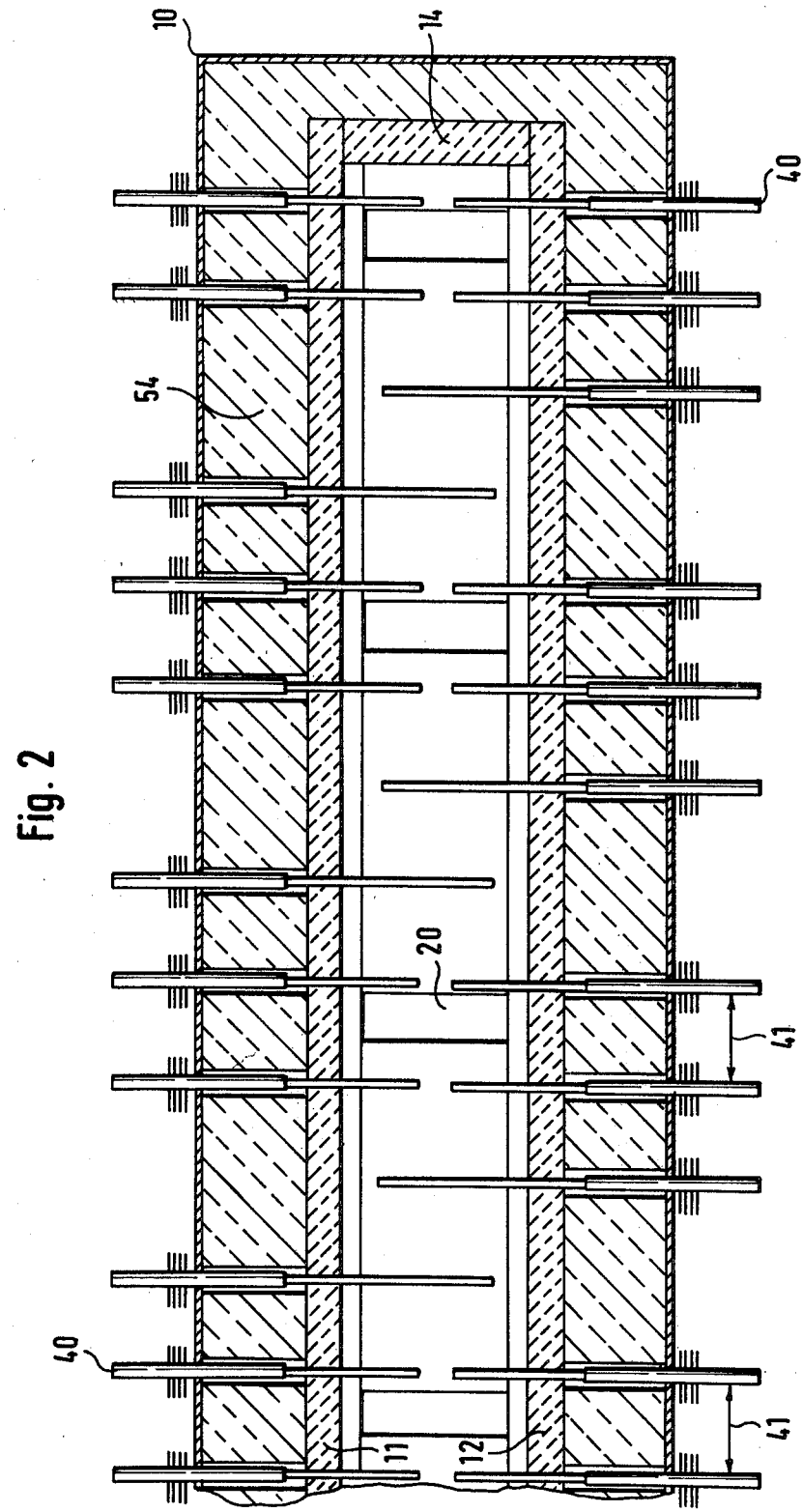
FIG. 2 is a sectional top view taken on the line II—II of FIG. 1.
Figure 3:
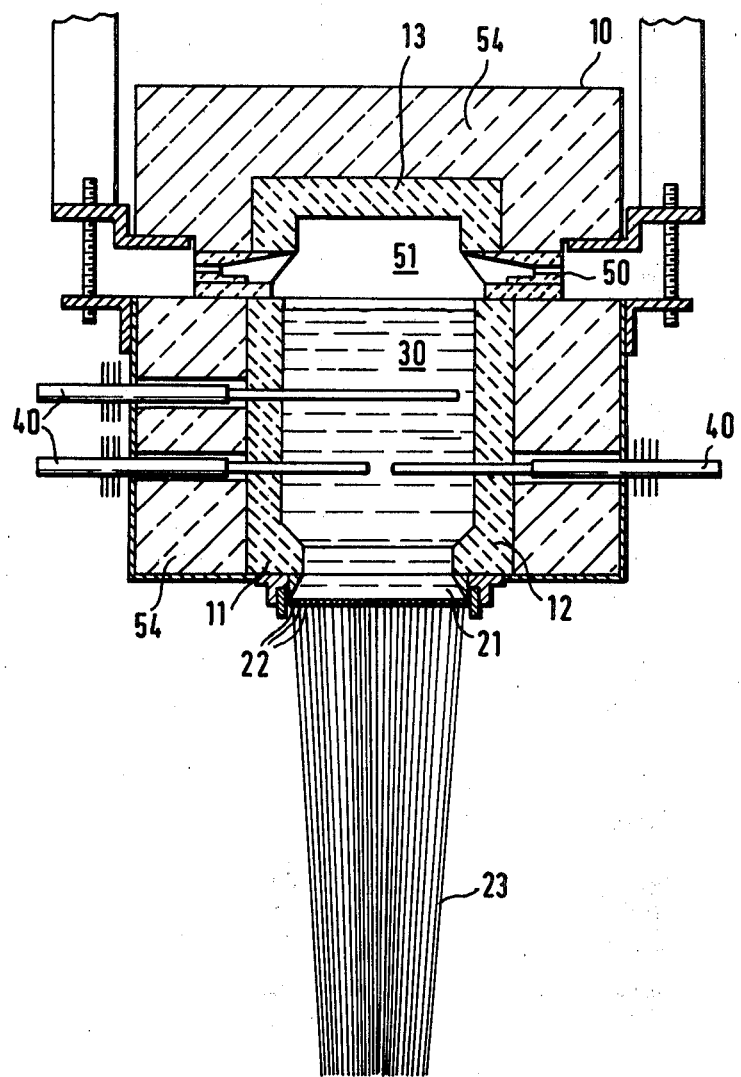
FIG. 3 is a cross-sectional view taken on the line III—III of FIG. 1.

Molten glass is fed from a tank furnace and a connecting channel, both not shown in the drawing, into several rectangular forehearths, one of them being shown at 10 in FIGS. 1–3. The forehearth 10 forms an elongate chamber 30 with sidewalls 11 and 12, a cover 13, an end wall 14 and a floor 15. The floor of forehearth 10 has a number of longitudinally spaced-apart passages 20 overlying respective bushings 21. The passages 20 are so disposed in floor 15 as to allow the molten glass to flow directly into the bushings 21. Each bushing 21 is provided with bores 22 through which the molten glass exits to form filaments 23. Feeder 10 is externally provided with insulation 54 and is filled with the molten glass mass to a level 52.

In accordance with the invention, two sets of electrodes 40 pass horizontally through sidewalls 11 and 12 into the chamber 30 in which the molten glass of high specific electrical resistivity accumulates. In the illustrated embodiment the electrodes 40 penetrate deep into the body of molten glass so that the free end of each electrode is spaced from the opposite wall, or from the tip of a confronting electrode in line therewith, by a distance much shorter than the width of chamber 30.

FIG. 2 also shows that each rectangular outlet passage 20, whose major sides are parallel to the electrodes 40, is flanked by two pairs of aligned electrodes from the sets respectively traversing sidewalls 11 and 12 while only two single, longer electrodes—one from each set—overlappingly extend at intervening locations. FIG. 1 shows that the electrodes are staggered in two vertically spaced tiers. It is essential to dispose the electrodes 40 so that they are completely enveloped and covered by the molten glass mass. Accordingly, a continuous supply of molten glass must be provided by the associated tank furnace to keep the electrodes sufficiently immersed.

Conventional top burners 50 are arrayed in sidewalls 11 and 12 adjacent a space 51, situated above the level 52 of the molten glass, which is open to the atmosphere via a flue 53. The top burners 50 could be omitted, with the electrodes 40 carrying the full load of supplying the required heat to the molten glass.

The longitudinal distances 41 between the electrodes 40 are chosen in such a manner as to achieve the proper exit temperature in the area of the passages 20 and neither crystallization nor obstructions can occur at the bushings 21.

Conventional electrically heated bushings 21 with floor areas of up to 500 cm$^2$ do not by themselves insure a homogeneous temperature distribution.

Preferably, the electrodes 40 are staggered in two vertically spaced rows as illustrated in FIG. 2. With suitable control of their energization, the molten glass arrives at the bushings 21 in a thermally and chemically homogeneous condition; this is important for the production of glass filaments, especially those of the aforementioned high-resistivity type, as the quality of the molten glass is improved and production proceeds smoothly.

The rod-shaped molybdenum electrodes 40 are suitably coupled at one end to a nonillustrated source which preferably supplies a 3-phase alternating current through a transformer and associated control circuitry. The opposite, free end of each electrode overlies a solid portion of the chamber floor 15 and is in contact only with the surrounding glass mass to be directly heated thereby.

As noted above, the increased efficiency of a device in accordance with the invention enables the column of molten glass in chamber 30 to have a height of up to 1,000 mm because practically no temperature drop occurs within the feeder.

A reasonable production rate is 1,500 kg of glass per day from a bushing 21 of 800 bores 22 to form filaments with a diameter of 14 microns. My improved device is of special importance for a filament-drawing process, developed a few years ago, using bushings of 6,000 or more bores.

I claim:

1. A device for making glass filaments, comprising:
    a forehearth forming an elongate chamber connected to a supply of molten glass, said chamber being bounded by a pair of parallel sidewalls and having a floor with a plurality of longitudinally spaced-apart passages constituting entrance apertures for underlying bushings provided with filament-shaping bores; and
    heating means including a multiplicity of rod-shaped electrodes extending into said chamber above solid portions of said floor adjoining and separating said passages, said electrodes being distributed throughout the length of said chamber below the level of a mass of molten glass of high specific electrical resistivity contained therein, each of said electrodes being connected at one end to a current source and having a free opposite end located within said chamber for directly heating said mass.

2. A device as defined in claim 1 wherein said electrodes are more highly concentrated in the vicinity of said passages than at intervening locations.

3. A device as defined in claim 1 or 2 wherein said electrodes extend horizontally into said chamber.

4. A device as defined in claim 3 wherein said electrodes form two sets projecting into said chamber from opposite sides.

5. A device as defined in claim 4 wherein each of said passages is flanked by two pairs of aligned electrodes from said sets.

6. A device as defined in claim 5 wherein other electrodes of said sets extend overlappingly past one another between adjacent passages.

7. A device as defined in claim 5 wherein said passages are rectangular with major sides paralleling said electrodes.

8. A device as defined in claim 3 wherein said electrodes form a plurality of relatively staggered tiers.

9. A device as defined in claim 3 wherein said heating means further includes an array of burners arrayed above said level.

10. A device as defined in claim 1 or 2 wherein said electrodes have outer diameters between substantially 5 and 30 mm.

11. A device as defined in claim 10 wherein said electrodes consist of molybdenum.

* * * * *